United States Patent [19]

Wells

[11] Patent Number: 4,580,412
[45] Date of Patent: Apr. 8, 1986

[54] PORTABLE REFRIGERATED UNIT

[76] Inventor: Raymond R. Wells, 9200 Bermuda Ct., Crestwood, Ky. 40014

[21] Appl. No.: 780,643

[22] Filed: Sep. 26, 1985

Related U.S. Application Data

[63] Continuation-in-part of Ser. No. 310,446, Oct. 13, 1981.

[51] Int. Cl.[4] .............................................. F25D 3/08
[52] U.S. Cl. ...................................... 62/372; 62/430; 62/457; 62/530
[58] Field of Search .................. 62/430, 457, 371, 372, 62/529, 530

[56] References Cited

U.S. PATENT DOCUMENTS

| | | | |
|---|---|---|---|
| 3,802,220 | 4/1974 | Pompo | 62/457 X |
| 4,266,407 | 5/1981 | Gibson | 62/457 X |
| 4,281,520 | 8/1981 | Norwood | 62/372 |
| 4,438,637 | 3/1984 | Atkinson | 62/457 |
| 4,481,792 | 11/1984 | Groeger et al. | 62/457 |

Primary Examiner—Lloyd L. King
Attorney, Agent, or Firm—Jon C. Winger

[57] ABSTRACT

A portable refrigerated unit for a beverage container such as, for example a soft drink can or bottle includes an outer case having two hinged together the mating halves. A refrigerant pack consists of two separate refrigerant cartridges each formed with a container receiving cavity which are removably installed in mating halves of the outer case. When a beverage container is installed in the cavities of the cartridges and the case is closed, the cavities of the refrigerant cartridges cooperate to completely encompass the beverage container. The refrigerant cartridges are formed with finger insets at appropriate locations at the perimeter of the container receiving cavities to aid in removing the cartridges from the outer case halves.

9 Claims, 6 Drawing Figures

PORTABLE REFRIGERATED UNIT

CROSS-REFERENCE TO RELATED APPLICATION

This application is a Continuation-in-Part to my co-pending Application Ser. No. 310,446, filed on Oct. 13, 1981.

BACKGROUND OF THE INVENTION

1. Field of the Invention

The present invention generally relates to the art of refrigeration, and more particularly to portable commodity containers including a coolant for keeping beverages cold.

2. Description of the Prior Art

There are many activities during which it would be desirable to have a cold drink available. Examples of such activities are tennis, hiking, golf, bicycle riding, fishing and the like. A cold drink would also be desirable to, for example those, people who may take their lunch to work or school.

Portable refrigerated beverage containers for these type activities should have a number of attributes. For example, they should be lightweight, economical to manufacture, protect the contents from breakage, attractive, sturdy and durable to withstand damage to itself, capable of accommodating a variety of beverage container shapes and sizes, and capable of keeping the beverage cold over an extended length of time.

A number of refrigerated portable beverage containers are known to me and are illustrated by the following U.S. Pats.

U.S. Pat. No. 3,401,535 issued on Sept. 17, 1968 to G. L. Palmer shows a quite large cooling container for beverages which is illustrated in the shape of a box. The container has an outer shell and an insert. The insert includes a number of cavities molded in the shape of a beverage can. The space between the insert and the outer shell is filled with a cooling medium such as water-alcohol solution. The tops of the beverage cans project above the top of the insert into recesses formed in an insulated removable cover so that they can be grasped for removal from the insert cavities when the insulated cover is removed. The container also has a carrying handle which is attached to the insert and extends through a hold in the removable cover.

U.S. Pat. No. 3,703,816 issued on Nov. 28, 1972 to Robert E. Weathers shows a double walled container with the space between the walls filled with a plastic gel for maintaining the contents of the container at a low temperature. The end closures of the container are removable and also of double walled construction filled with a pleastic gel. The inner wall is shaped to conform to a beverage can and the outer wall has an extension to receive a carrying strap. It is mentioned that the outside wall of the container can be decorated to indicate the nature of the contents.

U.S. Pat. No. 3,802,220 shows a shipping carton having an article receiving tray. The tray comprises a sheet of plastic vacuum formed to define article receiving recesses and a flat sheet of plastic bonded to the periphery of the formed sheet. The space between the formed sheet and the flat sheet is filled with a refrigerant which also has cushioning properties.

U.S. Pat. No. 3,859,819 issued on Jan. 14, 1975 to Marx Kaplan shows a lunch box which has one hollow wall filled with a refrigerant such as "blue ice".

U.S. Pat. No. 3,974,658 issued on Aug. 17, 1976 to Richard F. Starrett shows what appears to be a large portable refrigerator box. The walls of the refrigerator box are insulated. A hollow refrigerant cartridge, which has one wall formed with recesses to partially receive beverage containers, is inserted either in the bottom or the top of the box. The refrigerant cartridge is filled with a refrigerant substance such as a gel. The refrigerator box is dimensioned such that some of the individual beverage containers are in contact either with the refrigerant cartridge and with at least one of the other beverage containers for conductive refrigeration.

U.S. Pat. No. 4,266,407 issued on May 12, 1981 to David E. Gibson shows a portable cooler having two molded insulated container halves with matching indentations. The two halves close over the containers placed in the indentations. Recesses are formed in one container half to receive oblong packages of a refrigerant.

U.S. Pat. No. 4,281,520 issued on Aug. 4, 1981 to Donald D. Norwood shows a portable cooler for a bottle which allegedly fits a varied range of bottle sizes. The cooler comprises a pair of hollow cooling modules each containing a liquid refrigerant. The cooling modules are shaped with a generally semicircular inner surface to contact a beverage bottle. One end of module is open so that the neck of a beverage bottle protrudes therethrough, or is totally open so that the beverage bottle can be inserted in or withdrawn from the cooler without disassembling the cooler. The pair of cooling modules are held together in an assembly by means of straps circumscribing both modules.

None of the prior-art refrigerated portable beverage containers known to me adequately satisfy all the above-mentioned and desirable attributes.

SUMMARY OF THE INVENTION

The present invention recognizes the desirable and advantageous attributes for an advantageous portable beverage cooler which is light weight, economical to manufacture, protects the contents from breakage, accommodates a variety of beverage container shapes and sizes, keeps the beverage cold over an extended length of time, is attractive, sturdy and durable to withstand damage to itself and maintains its attractive appearance, and which is readily adaptable for advertising a particular beverage.

The present invention, more particularly, provides a portable refrigerated unit for housing beverage containers comprising an outer case formed of two mating halves of substantially mirror image configuration; hinge means interconnecting the case halves at one of these adjacent longitudinal edges; fastener means to hold the two mating halves in a closed position; and a different refrigerant cartridge adapted to be removably installed into each of said mating halves of said case, each of said refrigerant cartridges comprising a hollow envelope having an outer surface configured to substantially match the inner surface of one of the case halves and means defining an open cavity to receive about one half of the container to be housed within the refrigerant unit, the margin of each envelope surrounding the opening into the cavity being substantially coplanar with the edge of the case half in which it is installed so that when the case is closed, the margins of the cartridge envelopes in each case half mutually abut, and finger insets formed in the refrigerant cartridge at preselected locations at the periphery of cavity and open to the cavity to receive a human finger to aid in removing the refrigerant cartridges from the case.

BRIEF DESCRIPTION OF THE DRAWINGS

The foregoing features and advantages of the present invention will be fully understood upon reading the following disclosure and with reference to the following drawings wherein like numerals refer to like parts and in which.

DETAILED DESCRIPTION OF THE DRAWINGS

Figure 3:
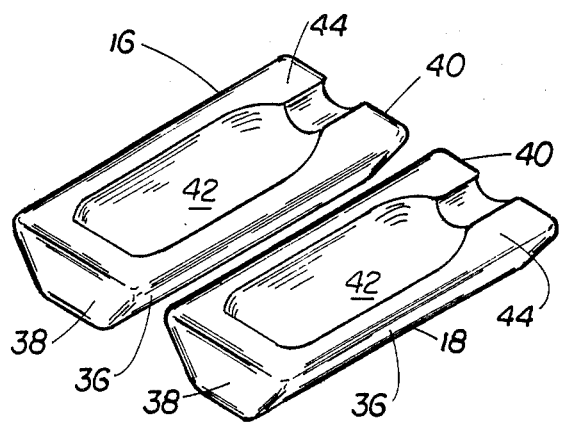
FIG. 3 is a perspective view of a component of the present invention.
Figure 1:
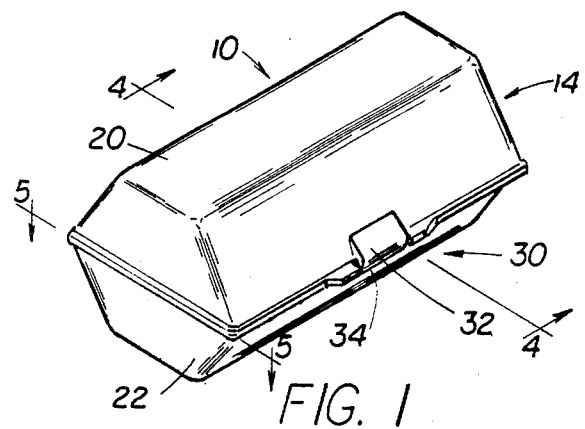
FIG. 1 is a perspective view of the present invention in a closed position.
Figure 2:
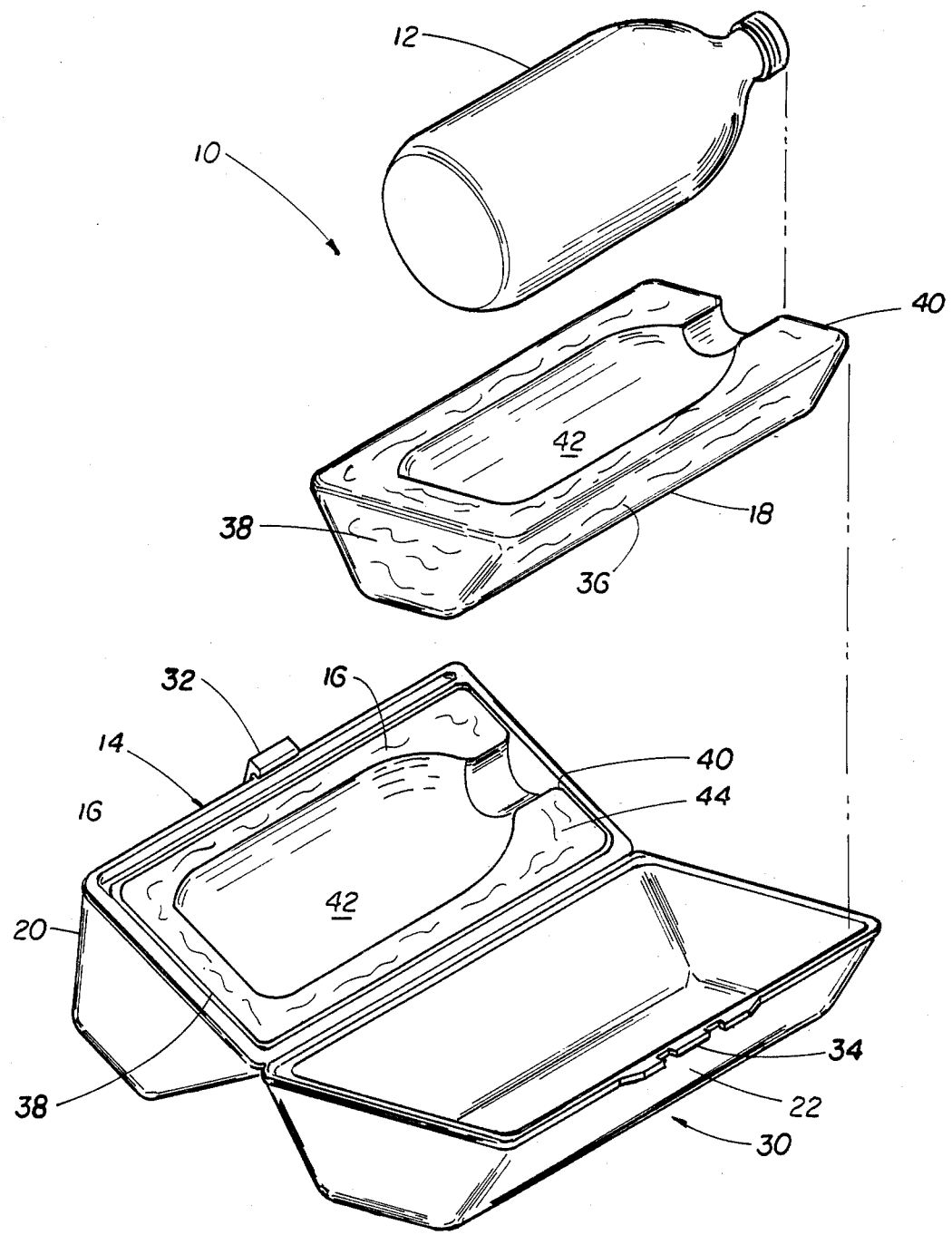
FIG. 2 is a perspective, partially exploded view of an advantageous embodiment of the present invention in the open position.

With reference to FIGS. 1 and 2, there is illustrated a portable refrigerated unit, generally denoted as the numeral 10, for keeping a beverage container 12 cold. The portable refrigerated unit 10 is shown as comprising an outer case, generally denoted as the numeral 14, and two refrigerant cartridges 16 and 18.

The outer case 14 comprises two mating halves 20 and 22 which are substantially identical. The mating halves 20 and 22 are connected together at their adjacent edges by hinge means 24 so that they are in mutual mirror image relationship and can be easily pivoted with respect to each other between a closed position (shown in FIG. 1) and an open position (shown in FIG. 2).

As shown in transverse cross-section, the two halves 20 and 22 are formed in the shape of halves of a hexagon such that when the case 14 is closed, the two halves cooperate to form a hollow case having a hexagonal transverse cross-section. This configuration is visually pleasing and provides for stacking the cases for efficient storage and shipping. Preferably, the case is fabricated of a high impact resistant plastic such as, for example, polystyrene or ABS, although other materials can be used. Furthermore, the case 14 is shown as being integrally formed. That is the two halves 20 and 22 are joined together by the hinge means 24 which is in fact integrally formed with each of the two halves 20 and 22. The hinge means 24 is shown as comprising a thin web of the plastic material from which the case is fabricated.

The case 14 also includes fastener means, generally denoted as the numeral 30, for retainign the two halves 20 and 22 together in mating relationship. As shown, the fastener means 30 comprises a latch 32 attached to one of the halves, for example half 22 and a corresponding striker 34 attached to the other one of the halves 20. The fastener means 30 is integrally formed with the respective case halves 20 and 22, or can be separate components attached thereto by for example, gluing. The striker 34 comprises a lip projecting outwardly of the case half 20 proximate one longitudinal edge, and the latch 32 is formed with a notch for receiving the lip of the striker. It is also contemplated that the fastener means 30 can be, for example, matching strips of "Velcro" material.

As shown in FIG. 1, the two container cartridges 16 and 18 are identical and are each hollow envelopes having one wall 36 and opposite ends 38 and 40 configured to substantially match the inner surfaces of the container halves 20 and 22, and formed with an open beverage container receiving cavity 42. The margin 44 of each of the cartridges 16 and 18 surrounding the opening into the cavity 42 is preferably planar. The cavity 42 in each cartridge 16 and 18 is in the shape of one longitudinal half of the beverage container 12 and is sized so that the surfaces of the cavity contact the wall of the beverage container 12. The refrigerant cartridges 16 and 18 are removably inserted into the case halves 20 and 22, respectively, such that they are in, what can be referred to as, mirror image relationship with each other. Further, when the cartridges 16 and 18 are in place in the case halfs 20 and 22, the margin 44 of each cartridge surrounding the cavity 42 are coplanar with the edges of the case half in which it is installed. Thus, when a beverage container is placed into the refrigerant unit 10 and the halves 20 and 22 are closed over each other, the margins 44 of the cartridge halfs 16 and 18 mutually abut and the thus refrigerant cartridges cooperate to completely encompass the beverage container 12 disposed in the cavities 42 of the cartridges 16 and 18.

Figure 5:
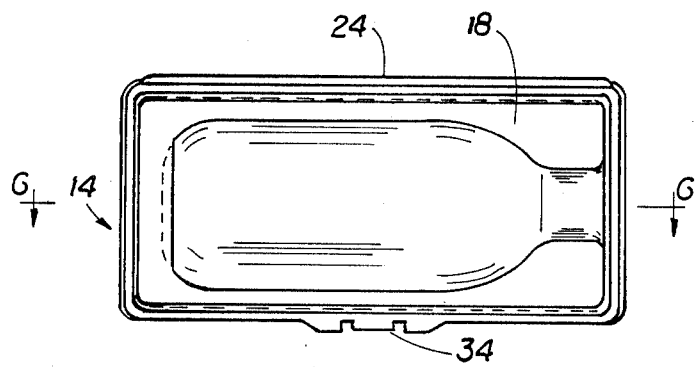
FIG. 5 is a cross-sectional view of the present invention as seen in the direction of arrows 4—4 in FIG. 3.
Figure 4:
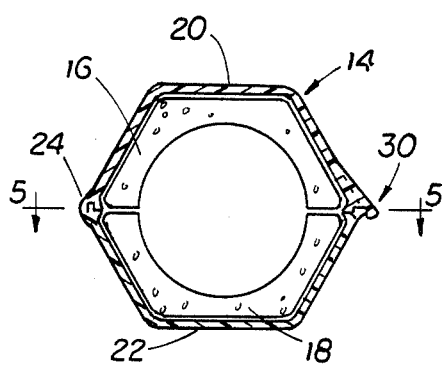
FIG. 4 is a transverse cross-sectional view of the invention of claim 1 in a closed position.
Figure 6:
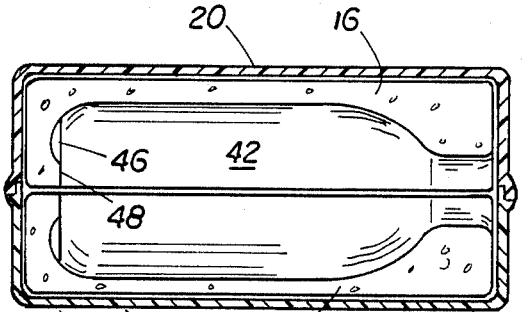
FIG. 6 is a cross-sectional view of the present invention as seen in the direction of arrows 5—5 in FIG. 3.

As can be best seen in FIGS. 4 and 5, each refrigerant cartridge 16 and 18 is formed with finger insets 46 at preselected locations at the perimeter of the cavity 42 and open to the cavity to aid in removing the cartridges 16 and 18 from the case halves 20 and 22. As shown, the finger insets 46 are formed in the cartridges at one end of the cavity 42. Further, the finger inset 46 in the form of a groove transversely oriented to the longitudinal axis of the cavity 42 and located a distance below the margin 44 of the cartridge surrounding the cavity 42 to form a finger grasp ridge 48.

Each of the refrigerant cartridges 16 and 18 can be fabricated of a somewhat rigid, tough plastic material with a refrigerant material disposed within its hollow interior. An advantageous refrigerant material is a gel material such as is described in U.S. Pat. No. 2,800,454 which is in the liquid state at room temperature and can readily be frozen by placing the cartridges 16 and 18 into an ordinary household freezer. Such a material is often referred to as "blue ice". The cartridges 16 and 18 are advantageously formed with the refrigerant sealed within the interior of the envelope.

Beverages, of course, come in a variety of different shaped and sized containers. The present invention recognizes this fact and provides a substantially universal portable refrigerant unit. The cavity 42 is of such a size and configuration as to accommodate a conventional 12 oz. can or 10 oz. bottle, and 12 oz. bottle. It is contemplated that different cartridges 16 and 18 which have differently sized and configured cavities 42 adapted to receive a different size and shape beverage container but having overall or outside dimensions and configurations so as to be interchangable in the case halves 20 and 22 can be used.

It should be noted that outer case 14 can be easily decorated with, for example, advertising indicia or fabricated in various attractive colors or designs.

in order to freeze the refrigerant enclosed in the refrigerant cartridges, the refrigerant cartridges are easily removed from their respective outer case halves 20 and 22 by placing ones finger tips in the finger inset 46 and pulling upwardly against the finger grasp ridge 48 and placed in the freezer unit of a household refrigerator. This has a number of advantages. For example, because the outer case 14 is not put into the freezer with the refrigerant cartridges, the outer case can be used with one pair of refrigerant cartridges of a set of cartridges 16 and 18 while another set of cartridges 16 and 18 is being frozen. Furthermore, because the refrigerant cartridges are easily removable from the case 14, both the case 14 and refrigerant cartridges can easily be cleaned.

The foregoing detailed description is given primarily for clarity of understanding and no unnecessary limitations are to be understood therefrom for modifications will become obvious to those skilled in the art upon reading this disclosure and can be made without departing from the spirit of the invention and scope of the appended claims.

What is claimed is:

1. A portable refrigerated unit for beverage containers, said unit comprising:
   a. an outer case formed of two mating halves of substantially mirror image configuration;
   b. hinge means interconnecting the case halves at one of their adjacent edges;
   c. fastener means for holding the two mating case halves in a closed position; and
   d. a different refrigerant cartridge adapted to be removably installed into each of the mating halves of the case, each of the refrigerant cartridges comprising a hollow envelope having an outer surface configured to substantially match the inner surface of one of the case halves, means defining an open cavity corresponding in shape to one half of the shape of the beverage container to be housed within the refrigerated unit, the margin of each cartridge surrounding the opening into the cavity being substantially coplanar with the edge of the case half in which it is installed so that when the case is closed the margins of the cartridges in each case half mutually abut and said cavities cooperate to encompass the beverage container, and finger grasp means associated with each of the refrigerant cartridges to aid in removing the cartridges from the case halves.

2. The portable refrigerant unit of claim 1, wherein the finger grasp means comprises means defining a finger inset at a preselected location at the perimeter of the cavity.

3. The portable refrigerant unit of claim 2, wherein the finger inset is open to the cavity.

4. The portable refrigerant unit of claim 3, wherein the finger inset further comprises a groove formed in the wall of the cavity spaced a distance from the margin of cartridge surrounding the cavity defining a finger grasp rib between the groove and margin.

5. The portable refrigerated unit of claim 1 further comprising a set of refrigerant cartridges comprising a plurality of interchangable pairs of refrigerant cartridges, each said pair of refrigerant cartridges being formed with cabities for receiving a differently sized or shaped beverage container.

6. The portable refrigerated unit of claim 1 wherein said refrigerant cartridges are fabricated of a washable material.

7. The portable refrigerated unit of claim 1, wherein said outer case of said portable refrigerant unit is molded of a high impact, dent resistant plastic material.

8. The portable refrigerated unit of claim 1, wherein said hinge means is integrally formed with each of said container halves.

9. The portable refrigerant unit of claim 1, wherein each case half has a cross-section in the configuration of one-half of a hexagon, and when in the closed position, the case halves mate to have a cross-section configuration of a hexagon.

* * * * *